(12) United States Patent
McManus (10) Patent No.: US 11,318,802 B2
(45) Date of Patent: May 3, 2022

(54) HITCH ASSEMBLY FOR A VEHICLE

(71) Applicant: James Douglas McManus, Mount-Calm, TX (US)

(72) Inventor: James Douglas McManus, Mount-Calm, TX (US)

( * ) Notice: Subject to any disclaimer, the term of this patent is extended or adjusted under 35 U.S.C. 154(b) by 162 days.

(21) Appl. No.: 16/888,701

(22) Filed: May 30, 2020

(65) Prior Publication Data

US 2021/0023897 A1    Jan. 28, 2021

Related U.S. Application Data

(60) Provisional application No. 62/922,037, filed on Jul. 22, 2019.

(51) Int. Cl.
*B60D 1/54* (2006.01)
*B60D 1/42* (2006.01)
*B60D 1/06* (2006.01)

(52) U.S. Cl.
CPC ............... *B60D 1/54* (2013.01); *B60D 1/065* (2013.01); *B60D 1/42* (2013.01); *B60D 2001/544* (2013.01)

(58) Field of Classification Search
CPC . B60D 1/54; B60D 1/065; B60D 1/42; B60D 2001/544; B60D 1/06; B60D 1/485
See application file for complete search history.

(56) References Cited

U.S. PATENT DOCUMENTS

| | | | | |
|---|---|---|---|---|
| 3,565,461 | A * | 2/1971 | Jones | B60D 1/54 280/491.3 |
| 7,338,064 | B1 * | 3/2008 | Williams | B60D 1/54 280/491.1 |
| 11,007,831 | B2 * | 5/2021 | Nance | B60D 1/52 |
| 11,179,984 | B2 * | 11/2021 | Gentner | B60D 1/54 |
| 2010/0270774 | A1 * | 10/2010 | Boberg | B60D 1/54 280/479.3 |
| 2019/0126700 | A1 * | 5/2019 | Belinky | B60D 1/06 |
| 2020/0215861 | A1 * | 7/2020 | Johnson | B60D 1/06 |
| 2020/0324596 | A1 * | 10/2020 | Belinky | B60D 1/065 |
| 2021/0331540 | A1 * | 10/2021 | Gentner | B60D 1/246 |

\* cited by examiner

*Primary Examiner* — Kevin Hurley
*Assistant Examiner* — Marlon A Arce
(74) *Attorney, Agent, or Firm* — The Law Office of Arthur Dula; Arthur Dula (57) ABSTRACT

A hitch assembly for a vehicle includes a cross-member structure disposed at a rear of the vehicle. The cross-member structure includes a bar extending from the first side frame to the second side frame, and a tube circumposed over the bar and having a central portion fixedly secured to the bar and a side portion rotatably coupled to the bar. The hitch assembly further includes a hitch structure adapted to move between a working position and a storage position. The hitch structure includes a base sleeve slidably circumposed over the tube and an arm extending from the base sleeve. In the working position, base sleeve is secured to the central portion and the arm extends outwardly of the rear end of the vehicle. In the storage position, the base sleeve is disposed circumposing the side portion and the arm is disposed underneath a chassis of the vehicle.

20 Claims, 6 Drawing Sheets

HITCH ASSEMBLY FOR A VEHICLE

CROSS-REFERENCE TO RELATED APPLICATIONS

The present application claims the benefit of provisional applications No. 62/922,037 filed Jul. 22, 2019.

TECHNICAL FIELD

The present disclosure relates, generally, to a hitch assembly for a vehicle, and more particularly relates to a hitch assembly having a hitch structure adapted to move between a working position and a storage position.

BACKGROUND

Vehicles, such as, trucks, generally include a hitch assembly at a rear end of the vehicles to facilitate a connection of trailers and towing of trailers. In general, the hitch assembly includes an arm fixedly attached to the frame and protruding outwardly from the rear of the vehicles for providing a primary connection with the trailer to be towed. As the arm protrudes outwardly of the vehicle, the existing hitch assembly obstructs a movement around the vehicle, which is undesirable. Also, removable hitch assemblies that can be detached from the vehicles after towing the trailer are known in the art. However, an attachment and the detachment of the hitch assembly from the vehicle is time consuming and requires special tools.

SUMMARY

In accordance with one embodiment of the present disclosure, a hitch assembly for a vehicle is provided. The hitch assembly includes a cross-member structure adapted to be disposed at a rear of the vehicle and is configured to extend from a first side frame of the vehicle to a second side frame of the vehicle. The cross-member structure includes a bar having substantially circular cross-section and extending from the first side frame to the second side frame. The cross-member structure further includes a tube having a non-circular cross-section and circumposed over the bar. The tube has a central portion fixedly secured to the bar and a side portion rotatably coupled to the bar. The hitch assembly further includes a hitch structure adapted to move between a working position and a storage position. The hitch structure includes a base sleeve slidably circumposed over the tube and an arm extending substantially perpendicularly to the base sleeve. In the working position, base sleeve is secured to the central portion and the arm is configured to extend outwardly of the rear end of the vehicle. Also, in the storage position, the base sleeve is disposed circumposing the side portion and the arm is adapted to be disposed underneath a chassis of the vehicle.

In accordance with another embodiment of the present disclosure, a vehicle is provided. The vehicle includes a chassis, a first side frame connected to a first lateral side of the chassis, and a second side frame coupled to a second lateral side of the chassis. The vehicle further includes a spare wheel disposed underneath the chassis and positioned proximate to a rear end of the vehicle and defining a storage space between the spare wheel and the first side frame. The vehicle further includes a cross-member structure disposed proximate to the rear end of the vehicle. The cross-member structure includes a bar having substantially circular cross-section and extending from the first side frame to the second side frame and a rube having a non-circular cross-section and circumposed over the bar. The bar has a central portion fixedly secured to the bar and a side portion rotatably coupled to the bar. Moreover, the vehicle includes a hitch structure engaged to the cross-member structure and adapted to move between a working position and a storage position. The hitch structure includes a base sleeve slidably circumposed over the tube and an arm extending substantially perpendicularly to the base sleeve. In the working position, base sleeve is secured to the central portion and the arm extends outwardly of the rear end of the vehicle. In the storage position, the base sleeve is disposed circumposing the side portion and the arm is disposed within the storage space, underneath the chassis of the vehicle.

DETAILED INSCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. The, use of any term should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 1:
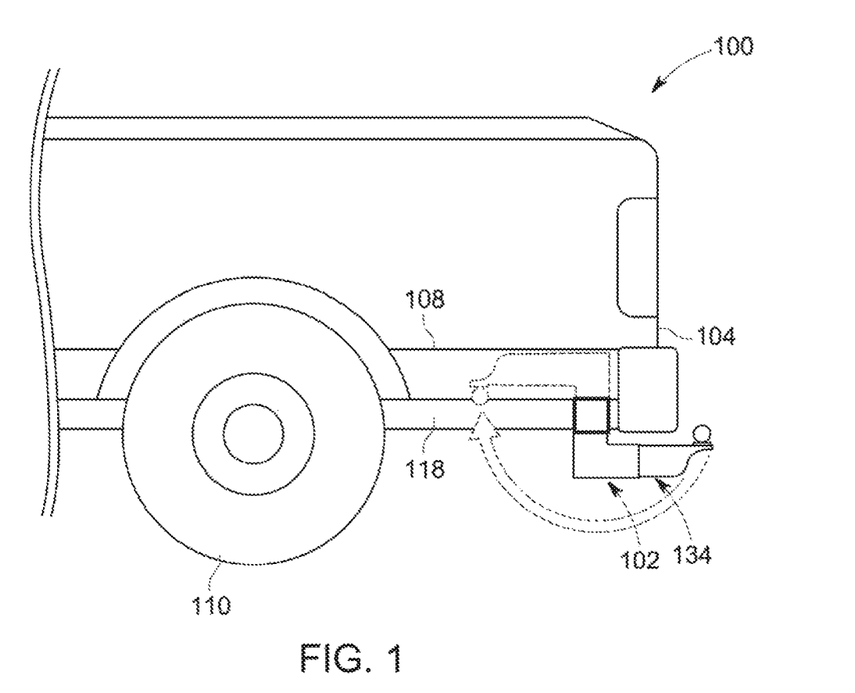
FIG. 1 illustrates a side view of a rear portion of an exemplary vehicle having an exemplary hitch assembly, in accordance with an embodiment of the disclosure.
Figure 2:
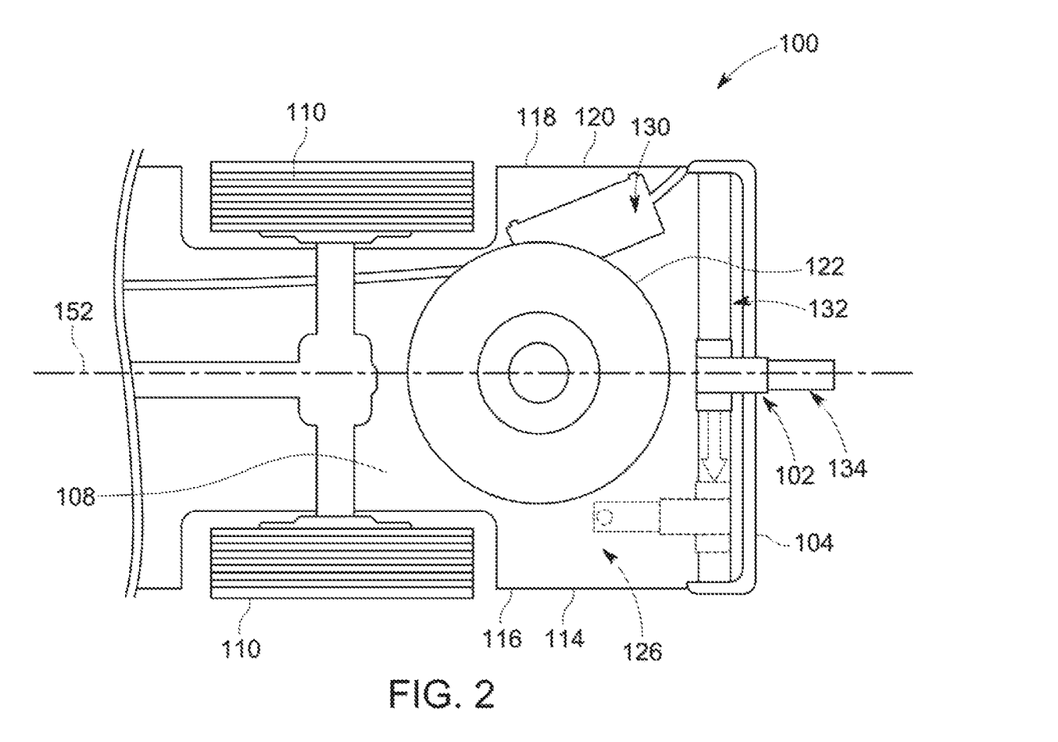
FIG. 2 illustrates a bottom view of the vehicle having the hitch assembly and depicting a hitch structure of the hitch assembly in a working position and depicting the hitch structure disposed in a storage position in phantom lines, in accordance with an embodiment of the disclosure.

Referring to FIGS. 1 and 2 a vehicle 100 having a hitch assembly 102 for facilitating a towing a trailer is shown. The vehicle 100 may be a truck or any other vehicle suitable for transporting passengers or goods, and may include a first end (not shown), a second end 104, a chassis 108 extending from the first end (i.e. the from end) to the second end 104 (i.e. the rear end 104) and adapted to support one or more system, components, or assembly of the vehicle 100. For example, the vehicle 100 may include a cabin supported on the chassis 108, a plurality of traction members 110, such as, wheels 110, coupled to the chassis 108 and supporting the chassis 108 on a ground and facilitates a movement of the vehicle 100 relative to the ground. Further, the vehicle 100 may include a first side frame 114 (i.e. right side frame 114) extending from a first longitudinal side 116 of the chassis 108 towards the ground, a second side frame 118 (i e. left side frame 118) disposed substantially parallel to the first side frame 114 and extending downwardly from a second longitudinal side 120 of the chassis 108 towards the ground. In an embodiment, the first side frame 114 and the second side frame 118 may extend from the rear end 104 of the vehicle 100 towards the front end of the vehicle 100, and may be substantially perpendicular to the chassis 108. Further, the vehicle 100 may include a spare wheel 122 suitable for use as a traction member when one of the traction members 110 is damaged. As shown the spare wheel 122 may be disposed underneath the vehicle 100 in a storage position. In the storage position, the spare wheel 122 may be attached to the chassis 108 and located proximate to the rear end 104 of the vehicle 100. As shown, the spare wheel 122 may be positioned centrally relative to a width or a lateral side of the vehicle 100 defining a first space 126 (also referred to as a storage space 126) between the spare wheel 122 and the first side frame 114 and a second space 130 between the spare wheel 122 and the second side frame 118.

Figure 3:
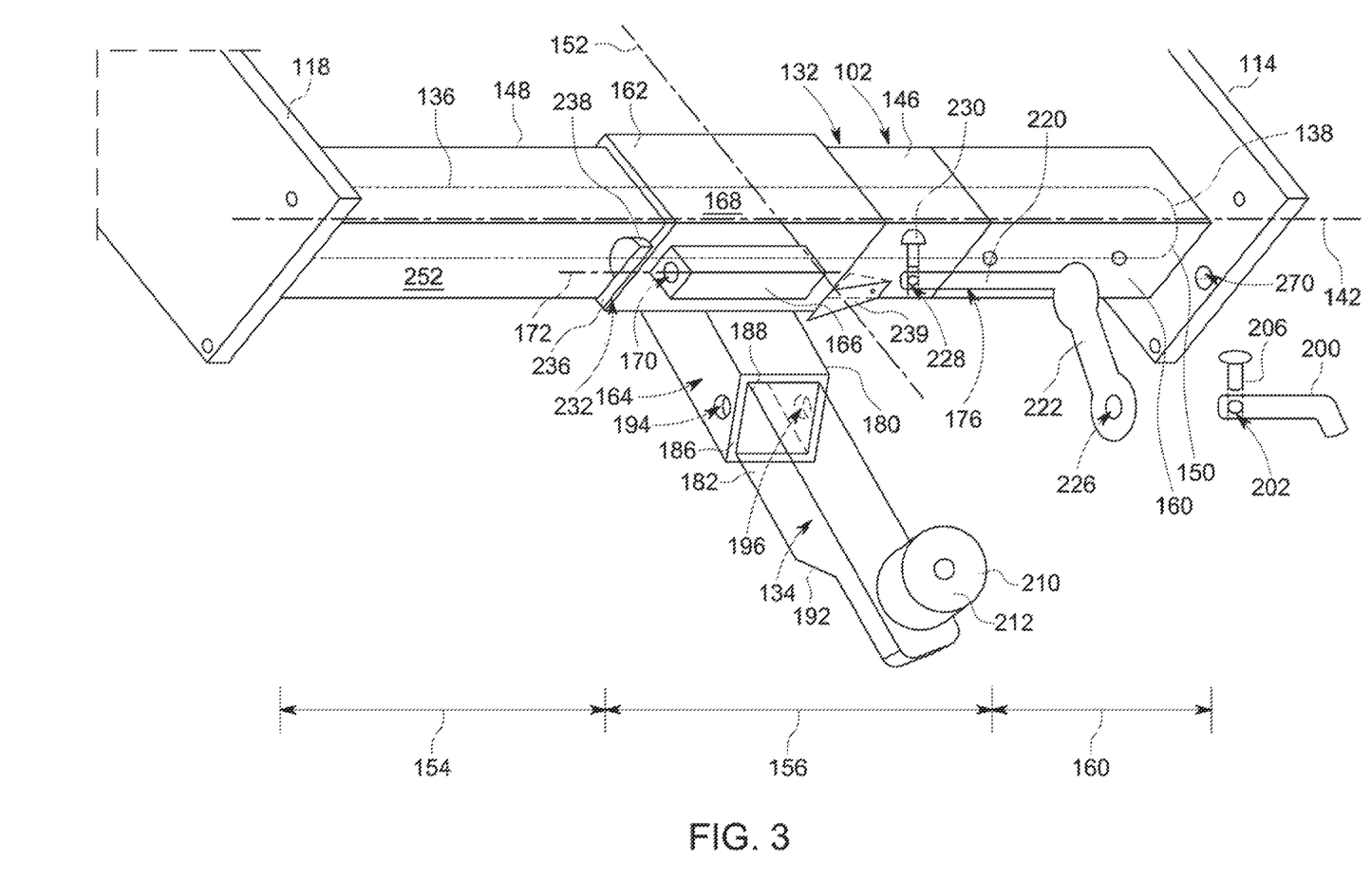
FIG. 3 illustrates a perspective view of the hitch assembly depicting a cross-member structure and the hitch structure disposed in the working position, in accordance with an embodiment of the disclosure.
Figure 4:
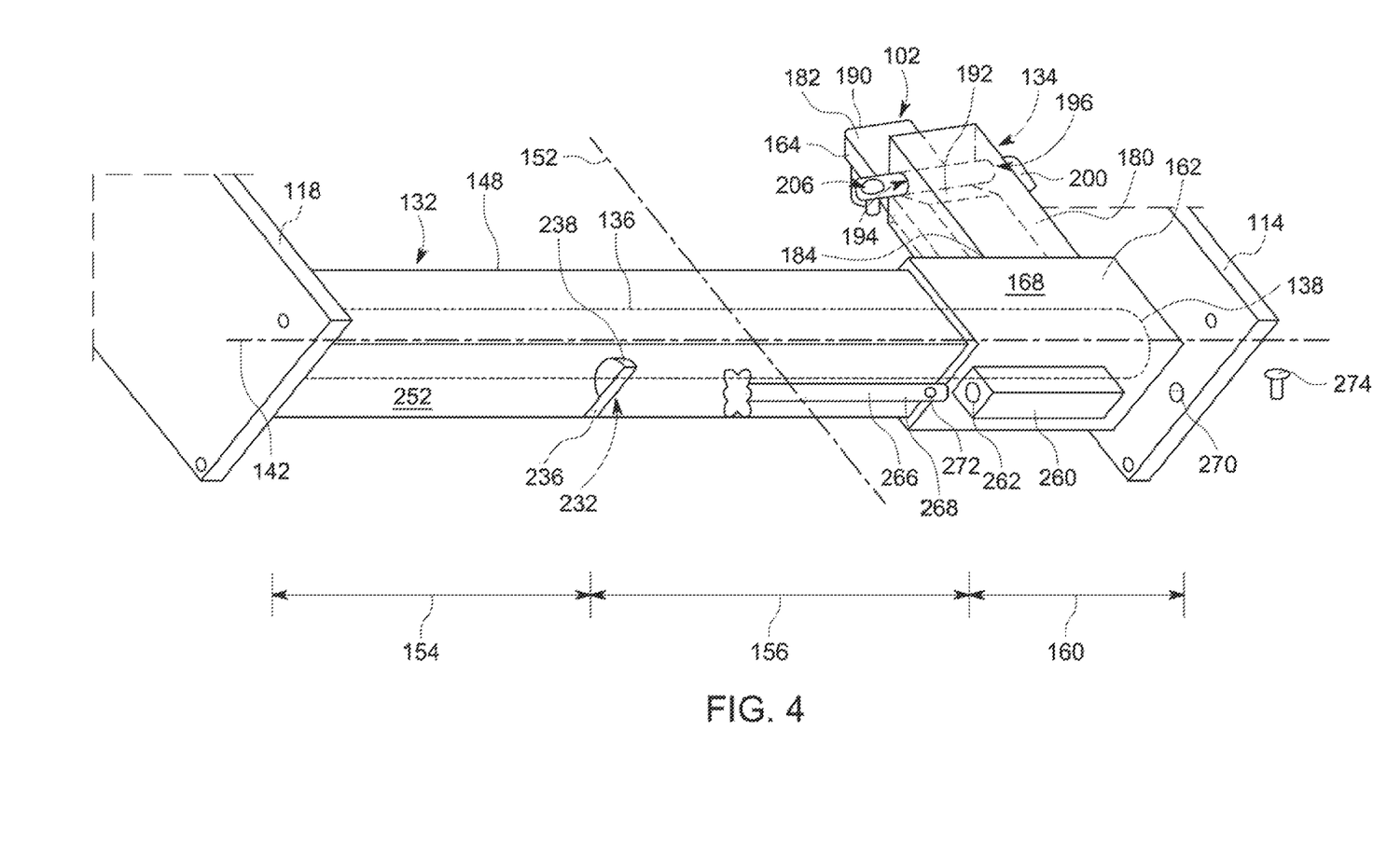
FIG. 4 illustrates a perspective view of the hitch assembly depicting the cross-member structure and the hitch structure disposed in the storage position, in accordance with an embodiment of the disclosure.

As shown in FIGS. 1 and 2, the hitch assembly 102 is disposed proximate to the rear end 104 of the vehicle 100, and include a cross-member structure 132 disposed underneath the chassis 108 and coupled to the vehicle 100, and a hitch structure 134 supported on the cross-member structure 132 and adapted to be positioned in a working position to facilitate a connection of the trailer or any other vehicle to the vehicle 100 and a storage position underneath the chassis when not in use. Referring to FIGS. 3 and 4, the cross-member structure 132 includes a bar 136 extending from the first side frame 114 to the second side frame 118 and having a first end 138 fixedly attached to the first side frame 114 and a second end (not shown) fixedly attached to the second side frame 118. In an embodiment, the bar 136 may be welded to the first side frame 114 and the second side frame 118. As shown, the bar 136 is a circular solid bar for facilitating a rotation of the hitch structure 134 about a central axis 142 of bar 136. Further, the cross-member structure 132 may include a tube 146 having a non-circular shape and disposed surrounding/circumposing the bar 136. The tube 146 is a hollow tube and extends from the first side frame 114 to the second side frame 118 along an entire length of the bar 136.

Figure 5:
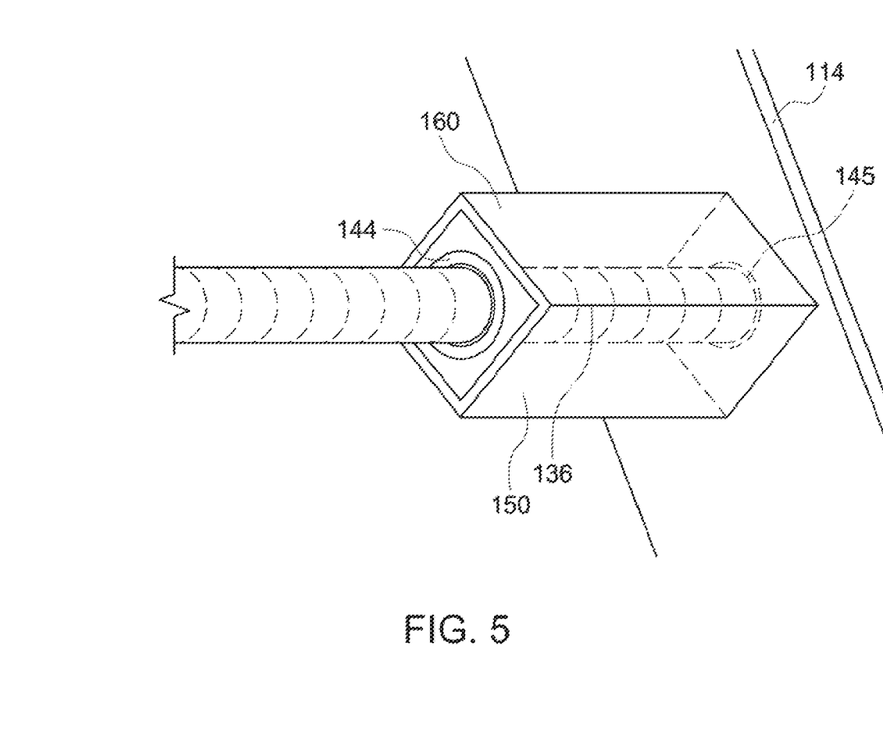
FIG. 5 illustrates a second side portion of a tube of the cross-member structure disposed over a bar and depicting a pair of bearings arranged between the bar and the second side portion.

The tube 146 includes a first portion 148 fixedly attached to the bar 136 and/or one of the side frames, for example, the second side frame 118, and a second portion 150 rotatably disposed over the bar. Accordingly, the first portion 148 remains stationary relative to the bar 136, while the second portion 150 may rotate relative to the bar 136. Therefore, the second portion 150 is a floating portion adapted to rotate about the central axis 142 of the bar 136. In an exemplary embodiment, the first portion 148 may extend from the second side frame 118 towards the first side frame 114, and may extend beyond a central longitudinal axis 152 of the vehicle 100. In some embodiments, the first portion 148 may include a first side portion 154 and a central portion 156 of the tube, while the second portion 150 may include a second side portion 160 of the tube 146. As shown, the first side portion 154 may extend from the second side frame 118 to the central portion 156, while the central portion 156 extends from the first side portion 154 to the second side portion 160. It may be appreciated that the central portion 156 may be disposed symmetrically about the central longitudinal axis 152 of the vehicle 100. In an embodiment, the tube 146 may include a square shape to prevent a rotation of the hitch structure 134 relative to the tube 146. In an embodiment, the cross-member structure 132 may include a pair of bearings 144, 145 (shown in FIG. 5) disposed between the bar 136 and the second side portion 160 facilitate a smooth rotation of the second side portion 160 relative to the bar 136. Further, a plurality of cert holes may extend from an outer surface of the second side portion 160 to the bearings to facilitate a greasing of the bearings 144, 145.

Referring to FIGS. 3, 4, 5, and 6, the hitch structure 134 may include a base sleeve 162 and arm 164 extending substantially perpendicularly and outwardly of the base sleeve 162. The base sleeve 162 may define an elongated hole 163 (best shown in FIG. 6) having a cross-section/shape complimentary to the outer shape or cross-section of the tube 146. As shown, the base sleeve 162 includes a square outer shape having a square elongated hole 163. The base sleeve 162 is arranged circumposing a portion 156 of the tube 146 and is adapted to slide relative to the tube 146. As shown in FIG. 3, in the working position of the hitch structure 134, the base sleeve 162 is arranged/disposed over the central portion 156, while in the storage position (shown in FIG. 4), the base sleeve is arranged over the second side portion 160, It may be appreciated that a length 'L1' of the base sleeve 162 is substantially equal or smaller than a length 'L2' of the second side portion 160. Also, in some implementations, the length 'L1' may be smaller than a length 'L3' of the central portion 156 of the tube 146. Further, the base sleeve 162 may include a housing 166 (hereinafter referred to as first housing 166) extending outwardly from an outer surface 168 of the base sleeve 162 and defining an elongated channel 170 having a central axis 172 disposed substantially parallel to a central axis of the base sleeve 162. The elongated channel 170 extends through an entire length of the first housing 166 and adapted to receive a pin member 176 facilitate a locking of the arm 164.

The arm 164 may be a telescopic arm having a first member 180 and a second member 182 adapted to telescopically extend or retract relative to the first member 180. The first member 180 may be a hollow tube to telescopically receive the second member 182, and includes a first end 184 (shown in FIG. 4) attached to the base sleeve 162, and a second end 186 disposed distally to the base sleeve 162. The second member 182 is adapted to telescopically move to an extended position (shown in FIG. 3) and a retracted position (shown in FIG. 4) relative to the first member 180, and includes a first end 188 disposed inside the first member 180 and a second end disposed outside the first member 182. A distance of the second end 190 of the second member 182 from the first member 180 may be adjusted by extending or retracting the second member 182 relative to the first member 180. Further, the second member may define a step 192 located proximate to the second end 190 to facilitate a locking of the second member 182 relative to the first member 180 in the retracted position.

Further, to facilitate the locking of the second member 182 with the first member 180 in the extended position or the retracted position, the first member 180 may include a pair of holes, for example, a first hole 194 and a second hole 196 disposed opposite to and aligned with the first hole 192. Each of the first hole 194 and the second hole 196 may extend from an outer surface to an inner surface of the first member 180, and receives a locking pin 200 of the hitch assembly 102 to lock the second member 182 relative to the first member 180 and prevent an extension or retraction of the second member 182 relative to the first member 180. The locking pin 200 may extend through the pair of holes 194, 196, and may abut the first end of second member to lock the second member 182 in the extended position. Similarly, the locking pin 200 may extend through the pair of holes 194, 196 and may abut the step 192 to lock the second member 182 in the retracted position. Further, the locking pin 200 may include a hole 202 extending laterally through the locking pin 200 to receive a locking structure 206, such as bolt, to prevent a disengagement of the locking pin 200 from the first member 180 and/or the second member 182. Moreover, the hitch structure 134 may include a coupler 210, for example, a hitch ball 212, coupled to the second member 182 to facilitate a coupling of the hitch assembly 102 with a trailer. As shown, the coupler 210 may be disposed proximate to the second end 190 of the second member 182, and may be removable from the arm 134. In an embodiment, the coupler 210 may be fixedly attached or integrally formed with the second member 182.

Additionally, or optionally, the pin member 176 of the hitch assembly 102 has a pin portion 220 and a handle portion 222 extending at an angle relative to the pin portion 220. The pin portion 220 is adapted to extend inside the first housing 166 through the elongated channel 170, while the handle portion 222 is adapted to receive the locking pin 200 to ensure a locking of the second member 182 with the first member 180. To receive the locking pin 200, the handle portion 222 may include a hole 226 extending laterally through the handle portion 222. Accordingly, in the locked position of the second member 182 with the first member 180, the pin portion 220 extends inside the first housing 166, and the locking pin 200 extends through the handle portion 222. Further, the pin portion 220 may define a through hole 228 to receive a locking structure 230, such as a pin, a bolt, or any other such engagement structure to ensure a retention of the pin portion 220 within the first housing 166.

Further, as shown in FIGS. 3 and 4, the cross-member structure 132 may include a locking element 232 to facilitate a locking of the hitch structure 134 (i.e. the base sleeve 162) with the cross-member structure 132 (i.e. the lube 146) to prevent the sliding of the hitch structure 134 relative to the cross-member structure 132 when the hitch structure 134 is arranged in the working position. As shown, the locking element 232 may include an inverted P shape having a straight portion 236 attached to an outer surface 252 of the tube 146 and a semi-circular portion 238 facing the outer surface 252 of the lube 146, and may be arranged at an interface of the first side portion 154 and the central portion 156. To lock the base sleeve 162 over the central portion 156 and prevent the sliding of the base sleeve 162 relative to the tube 146, a part of the pin portion 220, disposed outside the first housing 166 extends between the locking element 232 and the outer surface 252 of the tube 146. Further, in the locked configuration of the base sleeve 162 with the central portion 156, the locking element 232 is disposed between the locking structure 230 arranged inside the through hole 228 of the pin member 176 and the first housing 166.

Additionally, or optionally, as shown in FIG. 3, the cross-member structure 132 may include a latch 239 pivotally coupled to the tube 146 and arranged proximate to the second side portion 160. The latch 239 is adapted to move to a downward position due to gravity and is adapted to abut an end of the base sleeve 162 (as shown in FIG. 3) to prevent a sliding movement of the hitch structure 134 when the hitch structure 134 is arranged in the working position. To facilitate the sliding the hitch structure 134 (i.e. the base sleeve 162) relative to the cross-member structure 132, the latch 239 is pivoted upwardly (as shown in phantom lines in FIG. 3) such that the latch 239 loose contact from the base sleeve 162.

Figure 6:
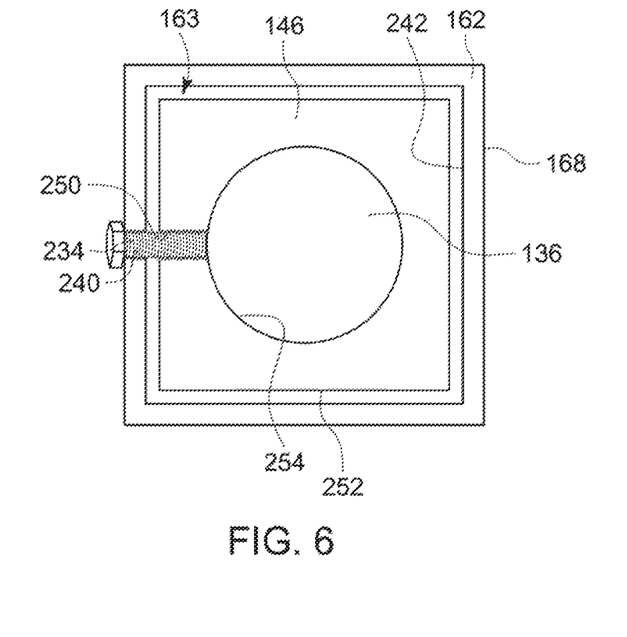
FIG. 6 illustrates a sectional view of the hitch assembly depicting a threaded bolt extending through a base sleeve and the tube and in contact with the bar, in accordance with an embodiment of the disclosure.

Moreover, referring to FIG. 6, the hitch assembly 102 may include a threaded bolt 234 adapted to engage with the base sleeve 162 and the cross-member structure 132 to prevent the sliding movement of the hitch structure 134 relative to tube 146 (i.e. the cross-member structure 132) when the hitch structure 134 is disposed in the working position. To facilitate an engagement of the threaded bolt 234 with the bar 136, the base sleeve 162 may define a first threaded opening 240 extending from the outer surface 168 of the base sleeve 162 to an inner surface 242 of the base sleeve 162, and the tube 146 defines a second threaded opening 250 extending from the outer surface 252 of the tube 146 to an inner surface 254 of the tube 146. To facilitate an insertion of the threaded bolt 234 and engagement of the threaded bolt 234 with the bar 136, the first threaded opening 240 is aligned with the second threaded opening 250 when the hitch structure 134 is moved to the working position.

Additionally, again referring to FIG. 4, to lock the hitch structure 134 in the storage position, the hitch structure 134 may include a housing 260 (hereinafter referred to as a second housing 260) arranged outside and substantially parallel to the base sleeve 162 and attached to the outer surface 168 of the base sleeve 162. The second housing 260 is arranged opposite to the first housing 166 and defines an elongated opening 262 to receive a locking member 266, such as a pin 268, to engage/couple the hitch structure 134 with the first side frame 114. Further, the first side frame 114 may include a hole 270 to receive the locking member 266, thereby enabling an engagement of the base sleeve 162 (i.e. the hitch structure 134) with the first side frame 114. Further, a rotation of the hitch structure 134 relative to the cross-member structure 132 is prevented due to the extension of the locking member 266 through the second housing 260 and the hole 270. Further, the locking member 266 may include a lateral hole 272 to receive a locking bolt 274 to prevent a disengagement/removal of the locking member 266 from the hole 270 and the second housing 260.

A working of the hitch assembly 102 is now explained. Initially, the hitch structure 134 may be disposed at the storage position (as shown in FIG. 4). At the storage position, the arm 162 is located beneath the chassis 108 inside the first space 126 located between the first side frame 114 and the spare wheel 122. To move the hitch structure 134 from the storage position, an operator, at first, may disengage the locking member 266 from the first side frame 114. For so doing, the operator may disengage the locking bolt 274 from the locking member 266 and then removes the locking member 266 from the hole 270 of the first side frame 114. Thereafter, the operator may rotate the hitch structure 134 along with the second side portion 160 of the tube 146 around the central axis 142 of the bar 136. In an embodiment, the operator may rotate the hitch structure 134 along with the second side portion 160 by 180 degrees. In such a ease, the arm 164 extends towards the rear end 104 and may extend outwardly of the rear end 104 of the vehicle 100. Subsequently, the operator may push/pull the hitch structure 134 and slides the base sleeve 162 over the tube 146, and positions the base sleeve 134 over the central portion 156 of the tube 146. The operator may arrange the base sleeve 162 over the tube 146 such that the first threaded opening 240 is aligned with the second threaded opening 250. Upon aligning the first threaded opening 240 with the second threaded opening 250, the operator may insert the threaded bolt 234 through the first threaded opening 240 and the second threaded opening 250, and engages the threaded bolt 234 with the bar 136. Due to the extension of the threaded bolt 234 through the second threaded opening 250 and the engagement of the threaded bolt 234 with the bar 136, any additional sliding movement of the hitch structure 134 relative to the tube 146 (i.e. the cross-member structure 132) is blocked. Also, the operator may position/extend a part of the pin portion 220 between the locking element 232 and the outer surface 252 of the tube 146 and arrange the locking structure 230 inside the through hole 228 such that the locking element 232 is arranged between the locking structure 230 and the base sleeve 162. Further locking structure 130 may be oriented so that a longitudinal axis of the locking structure 230 is disposed at an angle relative to the straight portion 236 of the locking element 232. Such an arrangement of the locking structure 230 and the locking element 232 may facilitate in preventing the sliding movement of the hitch structure 134 relative to the cross-member structure 132. In this manner, the operator positions the hitch structure 134 from the storage position to the working position.

Further, at the working position, the operator may move the second member 182 from the retracted position to the extended position and lock the second member 182 relative to the first member 180 at the extended position. For so doing, the operator, at first, may remove the locking structure 206 from the hole 202 and may turn the handle portion 222 upwardly. Thereafter, the operator may remove the locking pin 200 from the pair of holes 194, 196. In this manner, the operator disengages the locking pin 200 from the arm 164. Thereafter, the operator may extend the second member 182 and positions the second member 182 at the extended position. To lock the second member 182 at the extended position and prevent an insertion of the second member 182 inside the first member 180, the operator may turn the handle portion 222 and aligns the hole 226 with the pair of holes 194, 296, and then extends the locking pin 200 though the pair of holes 194, 196 and the hole 226 of the handle portion 222. Upon positioning and locking the second member 182 at the extended position, the operator may engage the coupler 210 with the trailer for facilitating the towing of the trailer by the vehicle 100.

For moving the hitch structure 134 from the working position to the storage position, the operator may move the second member 182 from the extended position to the retracted position, and locks the second member 182 at the retracted position. In the retracted position, a portion of the second member 182 is disposed inside the first member 180, and the locking pin 200 abuts the step 192. After positioning the second member 182 to the retracted position, the operator may remove the threaded bolt 234 from the second threaded opening 250 to enable the sliding of the base sleeve 162 (i.e. the hitch structure 134) relative to the tube 146 (i.e. the cross-member structure 132). Also, to enable the sliding of the hitch structure 134, the operator may disengage the pin portion 220 from the locking element 232 and moves the latch 239 upwardly to disengage the latch 239 from the base sleeve 162. Subsequently, the operator may slide the base sleeve 162 from the central portion 156 and positions the base sleeve 162 over the second side portion 160. In an embodiment, the operator may position the second member 182 at the retracted position after positioning the base sleeve 162 over the second side portion 160. Upon positioning the base sleeve 162 over the second side portion 160, the operator may rotate the hitch structure 134 along with the second side portion 160 and positions the arm 164 1 underneath the chassis 108 inside the first space 126. Thereafter, the operator may insert the locking member 266 inside the second housing 260 and extends the locking member 266 through the hole 270 of the first side frame 114, and locks the locking member 266 in engagement with the first side frame 114 and the base sleeve 162 by inserting the locking bolt 274 through the lateral hole 272 of the locking member 266. In this manner, the hitch structure 134 is moved and positioned at the storage position. Although a manual sliding and rotation of the hitch structure 134 is contemplated, it may be appreciated that hitch assembly 102 may include a plurality of actuators, such as, motors, to facilitate slide and rotate the hitch structure 134 relative to the bar 136. In such a case, the operator of the vehicle may actuate the actuators by pressing one or more switches disposed inside the cabin of the vehicle 100.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A hitch assembly for a vehicle, comprising:
a cross-member structure adapted to be disposed at a rear of the vehicle and configured to extend from a first side frame of the vehicle to a second side frame of the vehicle, the cross-member structure includes
   a bar having substantially circular cross-section and extending from the first side frame to the second side frame, and
   a tube having a non-circular cross-section and circumposed over the bar and having a central portion fixedly secured to the bar and a side portion rotatably coupled to the bar; and
a hitch structure adapted to move between a working position and a storage position, and including
   a base sleeve slidably circumposed over the tube, and
   an arm extending substantially perpendicularly to the base sleeve, wherein
      in the working position, base sleeve is secured to the central portion and the arm is configured to extend outwardly of the rear end of the vehicle, and
      in the storage position, the base sleeve is disposed circumposing the side portion and the arm is adapted to be disposed underneath a chassis of the vehicle.

2. The hitch assembly of claim 1, wherein the base sleeve is slidably moved over the side portion of the tube and rotated along with the side portion of the tube to move the hitch structure to the storage position from the working position.

3. The hitch assembly of claim 1, wherein the arm includes a first member and a second member adapted to telescopically move relative to the first member.

4. The hitch assembly of claim 1, wherein the hitch structure includes a coupler attached to the arm to facilitate a coupling of a trailer with the vehicle.

5. The hitch assembly of claim 3 further including a locking pin adapted to extend through the first member to lock the telescopic movement of the second member relative to the first member.

6. The hitch assembly of claim 5 further including
a pin member having a pin portion and a handle portion disposed at an angle relative to the pin portion,
a first housing attached to the base sleeve and extending along a longitudinal direction of the base sleeve,
wherein, to lock the first member to the second member, the pin portion extends inside the first housing and is secured to the first housing and the locking pin extends through the handle portion.

7. The hitch assembly of claim 1 further including
a second housing attached to the base sleeve and extending along a longitudinal direction of the base sleeve, and
a locking member adapted to extend through the second housing and couple the base sleeve to the second side frame for locking the hitch structure in the storage position.

8. The hitch assembly of claim 1 further including a threaded bolt adapted to extend through the base sleeve and the lube and engage with the bar to prevent a movement of the base sleeve relative to the bar.

9. The hitch assembly of claim 1, wherein the base sleeve includes an elongated hole having a cross-section complementary to the cross-section of the tube.

10. The hitch assembly of claim 1 further including at least one bearing disposed between the bar and side portion for facilitating the rotation of the side portion relative to the bar.

11. A vehicle, comprising:
a chassis;
a first side frame connected to a first lateral side of the chassis and a second side frame coupled to a second lateral side of the chassis;
a spare wheel disposed underneath the chassis and positioned proximate to a rear end of the vehicle and defining a storage space between the spare wheel and the first side frame;
a cross-member structure disposed proximate to the rear end of the vehicle and including
   a bar having substantially circular cross-section and extending from the first side frame to the second side frame, and
   a tube having a non-circular cross-section and circumposed over the bar and having a central portion fixedly secured to the bar and a side portion rotatably coupled to the bar; and
a hitch structure engaged to the cross-member structure and adapted to move between a working position and a storage position, the hitch structure includes
   a base sleeve slidably circumposed over the tube, and
   an arm extending substantially perpendicularly to the base sleeve, wherein
      in the working position, base sleeve is secured to the central portion and the arm extends outwardly of the rear end of the vehicle, and
      in the storage position, the base sleeve is disposed circumposing the side portion and the arm is disposed within the storage space, underneath the chassis of the vehicle.

12. The vehicle of claim 11, wherein the base sleeve is slidably moved over the side portion of the tube and rotated along with the side portion of the tube to move the hitch structure to the storage position from the working position.

13. The vehicle of claim 11, wherein the arm includes a first member and a second member adapted to telescopically move relative to the first member.

14. The vehicle of claim 11, wherein the hitch structure includes a coupler attached to the arm to facilitate a coupling of a trailer with the vehicle.

15. The vehicle of claim 13, further including a locking pin adapted to extend through the first member to lock the telescopic movement of the second member relative to the first member.

16. The vehicle of claim 15 further including a first locking assembly for facilitating a locking of the second member
a pin member having a pin portion and a handle portion disposed at an angle relative to the pin portion,
a first housing attached to the base sleeve and extending along a longitudinal direction of the base sleeve,
wherein, to lock the first member to the second member, the pin portion extends inside the first housing and is secured to the first housing and the locking pin extends through the handle portion.

17. The vehicle of claim 11 further including
a second housing attached to the base sleeve and extending along a longitudinal direction of the base sleeve, and a locking member adapted to extend through the second housing and couple the base sleeve to the second side frame for locking the hitch structure in the storage position.

18. The vehicle of claim 11 further including a threaded bolt adapted to extend through the base sleeve and the tube and engage with the bar to prevent a movement of the base sleeve relative to the bar.

19. The vehicle of claim 11, wherein the base sleeve includes an elongated hole having a cross-section complementary to the cross-section of the tube.

20. The vehicle of claim 11 further including at least one bearing disposed between the bar and side portion for facilitating the rotation of the side portion relative to the bar.

* * * * *